Jan. 26, 1971  J. D. AGNEW  3,557,646
MACHINE TOOL

Filed June 24, 1968  4 Sheets-Sheet 1

INVENTOR
JOHN D. AGNEW
By Martin J. Carroll
Attorney

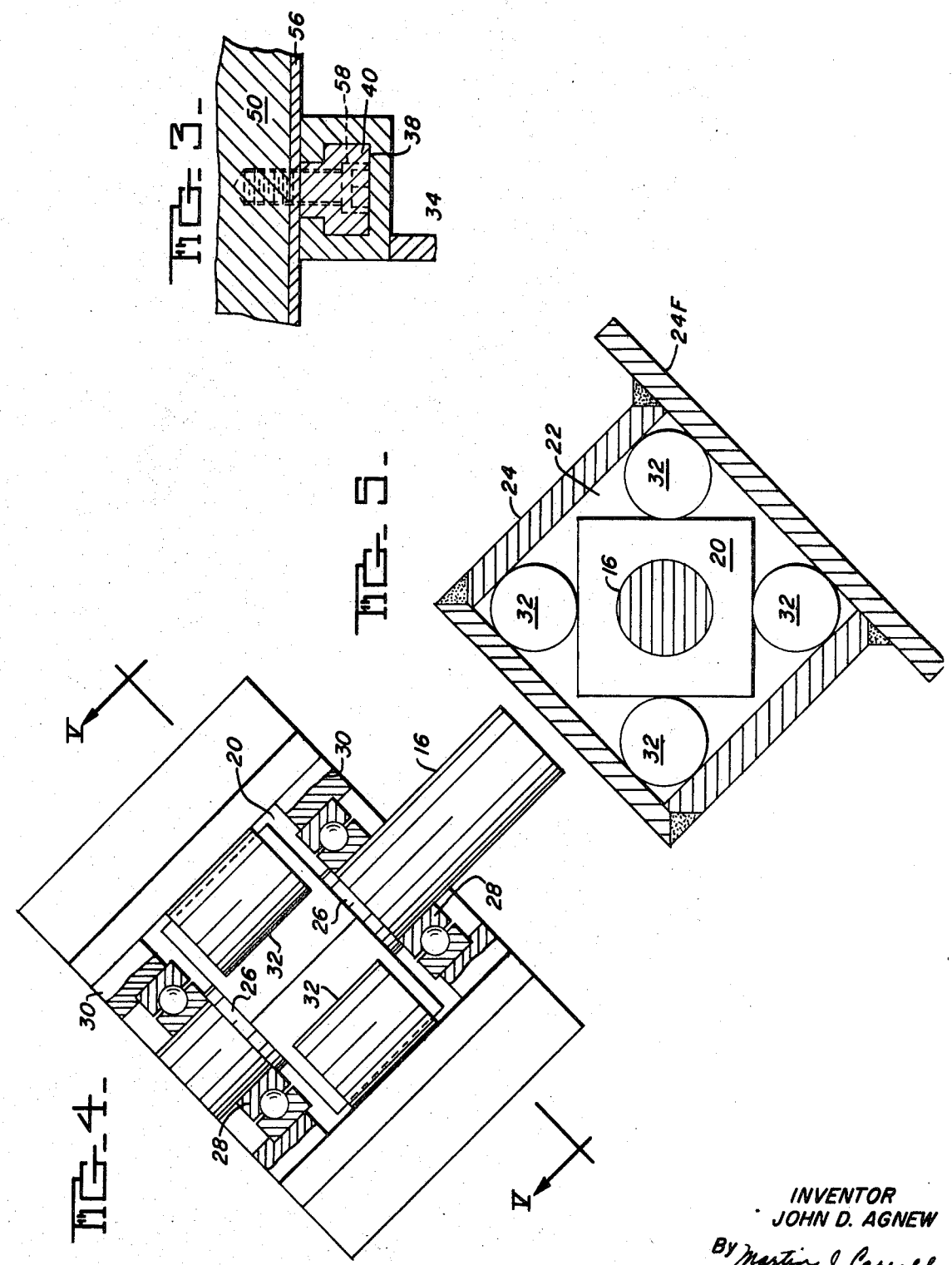

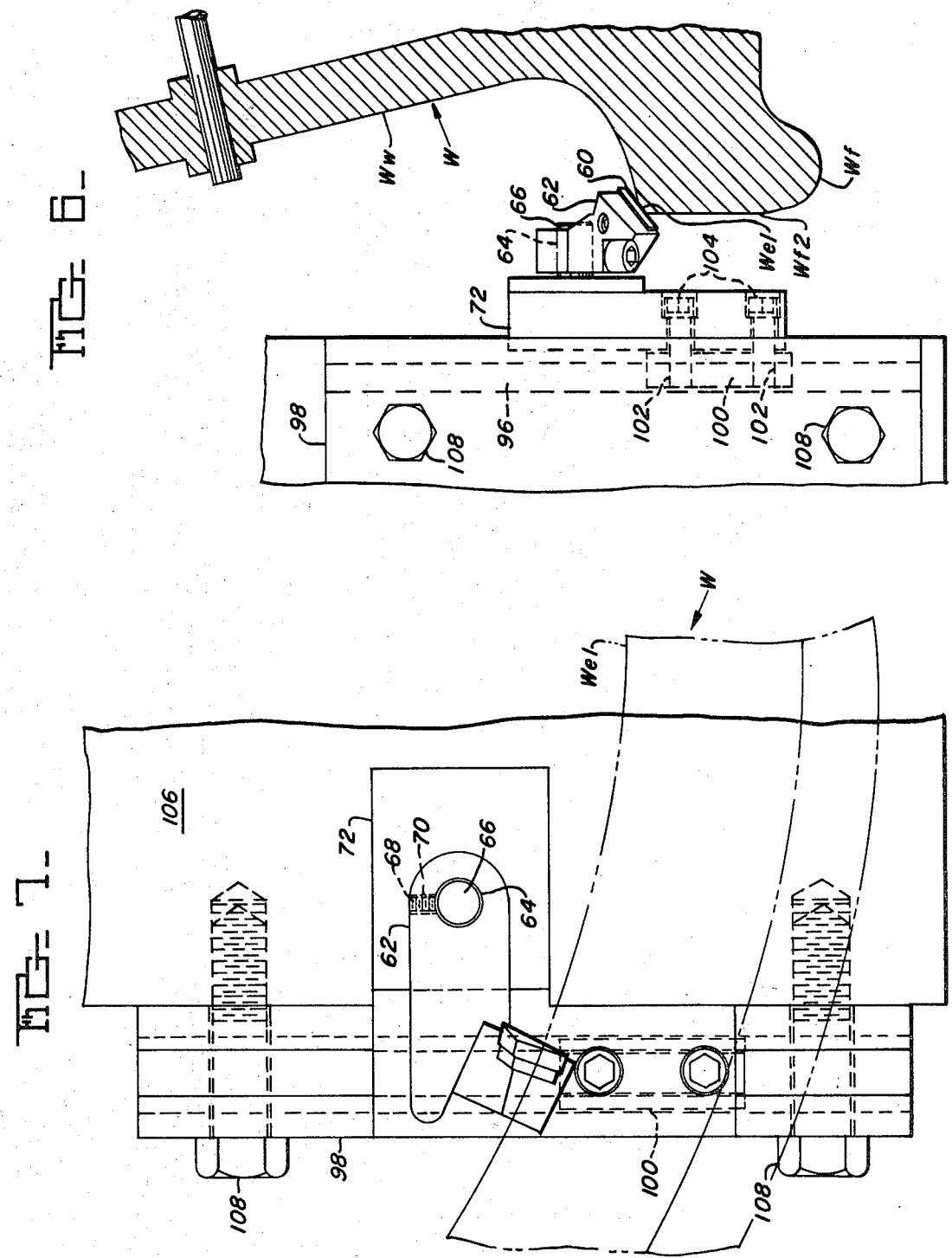

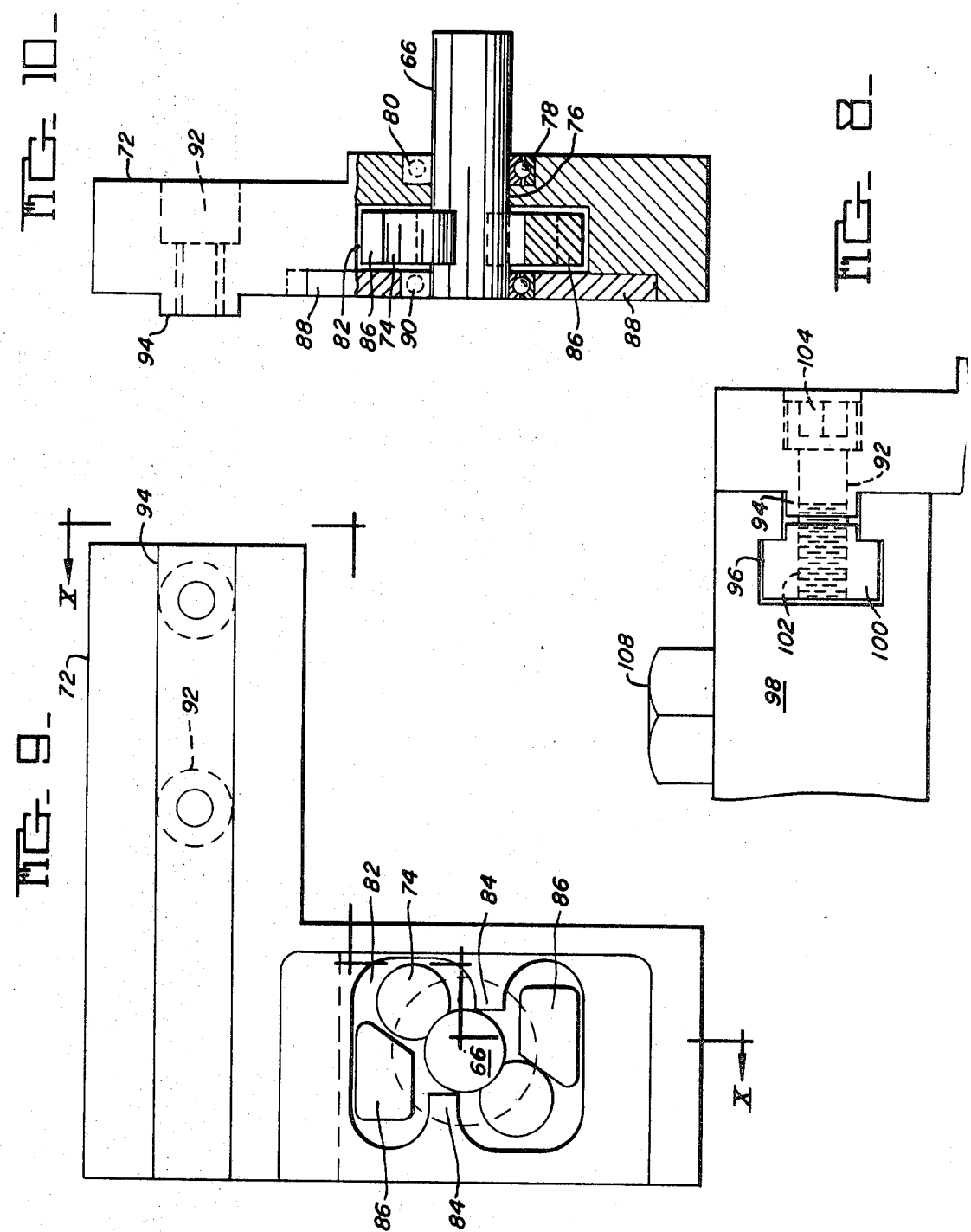

United States Patent Office 3,557,646
Patented Jan. 26, 1971

3,557,646
MACHINE TOOL
John D. Agnew, Valparaiso, Ind., assignor to United States Steel Corporation, a corporation of Delaware
Filed June 24, 1968, Ser. No. 739,465
Int. Cl. B23b 5/00
U.S. Cl. 82—2                                                6 Claims

ABSTRACT OF THE DISCLOSURE

Apparatus for removing the burr from a corner of a rotating railroad wheel including a cutter mounted on a rotatable shaft in offset relationship thereto, means for holding said shaft from rotation during normal machining operation but permitting limited rotation under excessive pressure so that the tool is removed from contact with the wheel. This holding means includes distortable slugs which bear against an enlarged portion on the shaft.

---

This invention relates to a machine tool and more particularly to a tool for removing burrs from edges or corners of a rotating railroad wheel. After the hub, rim and tread are machined, a sharp edge or burr remains at the junction of the rim and the web on both sides of the wheel. Prior to my invention it was necessary to use a file or the like to manually remove the burrs. Filing is a slow, hazardous and costly operation which requires individual handling of wheels, removal of the wheels from the machining line and then return of the wheels to the machining line. Also, a nonuniform finish is obtained. While it has been tried to remove the burrs by machine tools I do not know of any such tools that were successful in use. One problem in mechanical machining is due to wheel eccentricity or out of roundness which results in the cutting tool causing inadequate and irregular de-burring, gouging of the wheel, and/or tool breakage.

It is therefore an object of my invention to provide a simple, economical and efficient tool for mechanically removing the burrs from a railway car wheel or similar workpiece.

Another object is to provide such a device that provides a uniformly machined edge without damaging the workpiece.

Figure 1:
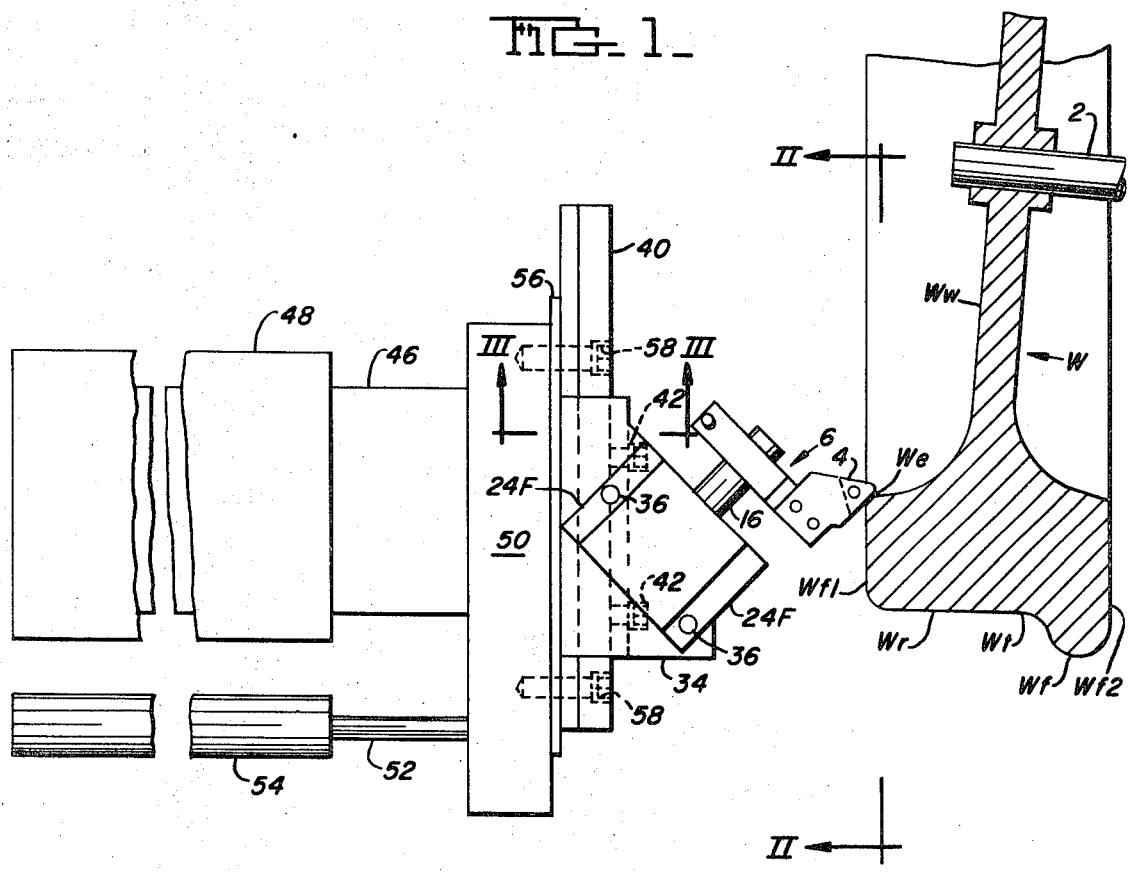
Figure 2:
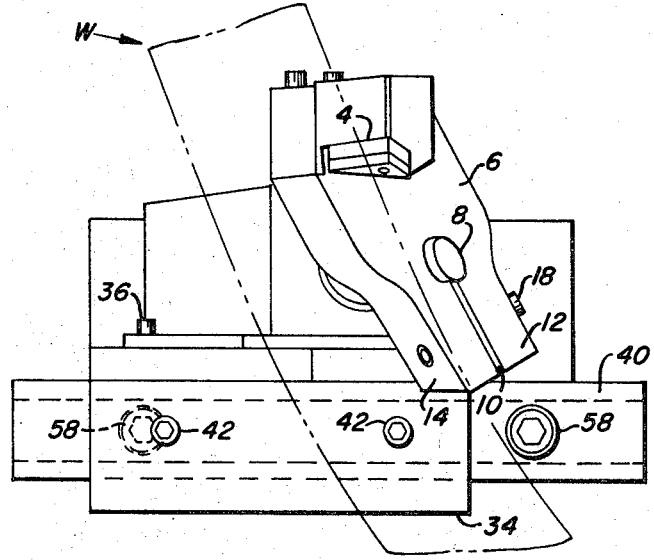

These and other objects will be more apparent after referring to the following specification and attached drawings, in which:

FIG. 1 is a plan view of one embodiment of my invention;
FIG. 2 is a view taken on the line II—II of FIG. 1;
FIG. 3 is a sectional view taken on the line III—III of FIG. 1;
FIG. 4 is a view of the shaft housing with one side removed and parts broken away and shown in section;
FIG. 5 is a view taken on the line V—V of FIG. 4;
FIG. 6 is a plan view of a second embodiment of my invention;
FIG. 7 is an end view of FIG. 6 on an enlarged scale;
FIG. 8 is a partial side view of FIG. 6 on an enlarged scale;
FIG. 9 is a view of a shaft housing for the second embodiment with the cover plate removed; and
FIG. 10 is a view taken on the line X—X of FIG. 9.

Referring more particularly to FIGS. 1 to 5 of the drawings, reference numeral 2 indicates a rotating work holder for a wheel W including a web Ww, a rim Wr having a tread Wt, flange Wf, a front face Wf1 and a rear face Wf2. After the front face Wf1 is machined, it is desired to remove burrs from edge We between the front face Wf1 and web Ww. This is done by means of a cutting tool 4 mounted on one end of a tool holder 6 in a conventional manner. A hole 8 is provided in the tool holder 6 intermediate its ends with a slot 10 extending from the hole 8 to the end of holder 6 remote from cutter 4, thus forming spaced arms 12 and 14. A shaft 16 having spaced cylindrical sections is received in the opening 8 and the holder 6 is locked in place thereon by means of a screw 18 passing through a hole in arm 12 into a threaded hole in the arm 14. Tightening of the screw 18 draws the arms 12 and 14 together to lock the holder 6 on the shaft 16.

According to my invention the shaft 16 has an enlarged square section 20 intermediate its ends which is received in a square chamber or opening 22 of a housing 24. The diagonal of the square section 20 is of shorter length than the sides of the chamber 22. Washers 26 are provided on each side of enlarged section 20 and a bearing 28 is retained on the shaft 12 on each side of square portion 20 between each washer 26 and a bearing plate 30. The bearing plates 30 may be retained in position in any suitable manner. The enlarged section 20 is normally held in position with its sides at an angle of 45° to the sides of opening 22 by means of four cylindrical slugs 32 as shown in FIG. 5. These slugs are made of relatively incompressible but deformable material, such as polyurethane which has proved satisfactory. Such material may be obtained under the trade name Durthane 7X-26 from Power Transmission, Inc., Durthane Division, Chicago, Ill. The housing 24 is secured to a slide 34 by means of socket head cap screws 36 passing through housing flanges 24F into threaded holes in slide 34. Slide 34 has a T-slot 38 which receives a T-way 40. The slide 34 may be moved along T-way 40 and then held in adjusted position thereon by means of socket head set screws 42 which pass through threaded holes in slide 34 and bear against the T-way 40. A rectangular, reciprocating ram 46 is received in a guide 48 for movement toward and away from wheel W. For this purpose an end plate 50 is attached to the end of ram 46 and also to a piston rod 52 of a hydraulic motor 54. The T-way 40 is secured to the end plate 50, with a spacer plate 56 therebetween, by means of socket head screws 58.

In operation, the slide 34 is moved along T-way 40 to position the cutter 4 to engage the edge We of the particular size wheel being machined. The cutter is then moved forward toward the wheel W by applying pressure to the rear end of hydraulic motor or cylinder 54 to advance the ram 46 and to hold the cutter at a predetermined pressure with respect to the wheel while the wheel makes two or three revolutions which is all that is necessary to remove the burr. The cutter 4 is then retracted either manually or automatically. It will be seen that the pressure of the cutter 4 against the wheel W is transmitted through the shaft 16 to the slugs 32 by the sides of square section 20 with the slugs maintaining a flexible pressure irrespective of any eccentricity or variation in alignment of the wheel. Thus, the cutter 4 is kept in constant flexing contact with edge We to produce a uniformly smooth bevel to that edge. Over deflection of the cutter 4, such as occurs if the tool is not properly set or when the diameter of the wheel at the edge We of the wheel is too eccentric, will cause the shaft 16 to rotate through an arc greater than 45° with the sides of the enlarged square portion 20 twisting past the slugs 32, thus backing off the tool to a position away from the wheel. To re-set the tool it is only necessary to manually twist the tool holder 6 to return the shaft 16 to its original position.

FIGS. 6 to 10 show a second embodiment of my invention which was developed because of the very narrow space between the wheel and the cutters for the hub and the rim face on the turret-type machine tool used in machining the wheel. In this embodiment a cutting blade 60 is mounted on a tool holder 62 which has a hole 64 therethrough at the end opposite the cutting blade 60. A shaft 66 is received in the hole 64 and held in place by means of a set screw 68 threaded into a hole 70 in the holder 62. The shaft 66 is rotatably supported in one leg of an L-shaped housing 72 and has an enlarged butterfly section 74 intermediate its ends, the wings of which are substantially cylindrical. The housing 72 has an opening 76 therethrough for receiving the shaft 66. The opening 76 has a cylindrical enlarged diameter portion 78 into which is press fitted a roller bearing 80. The opening 76 has an enlarged chamber 82 of noncircular shape. Walls 84 divide the chamber 82 into two compartments, one for receiving each wing of enlarged shaft section 74. A slug 86 is received in each compartment and bears against the associated wing. The slug is made of the same material as slugs 32 of the first embodiment, but is rectangular in cross section. The slugs 86 are so positioned as to resist rotation of the shaft 66 in a counter-clockwise direction (FIG. 9). A cover plate 88 having a roller bearing 90 press fit therein is secured to housing 72 on the side opposite bearing 80 with the shaft 66 being received in bearing 90. A second leg of the housing 72 has holes 92 therethrough with a flange 94 extending from the side opposite bearing 80. The flange 94 extends into a T-shaped slot 96 provided in a hold-down plate 98. A T-shaped slide 100 is provided in the T-slot 96 and has threaded holes 102 therein for receiving socket head screws 104 which pass through openings 92 in housing 72. Tightening of screws 104 will lock the housing 72 in adjusted position. The hold-down plate 98 is attached to a movable turret 106 by means of cap screws 108.

In operation, the slide 100 is moved along T-slot 96 to position the cutter 60 so as to engage the edge W$e$1 of the particular size wheel being machined. The cutter 60 is held in engagement with the edge W$e$1 while the wheel makes two or three revolutions to remove the burr after which the cutter is retracted in the usual way by the turret mechanism. It will be seen that the pressure of the cutter 60 against the wheel W is transmitted through the shaft 66 to the slugs 86 by the enlarged shaft section 74 with the slugs maintaing a flexible pressure irrespective of any eccentricity or variation in alignment of the wheel. Thus, the cutter 60 is kept in constant flexing contact with edge W$e$1 in substantially the same manner as in the first embodiment. The slugs 86 are distorted only within the enlarged chamber 82 which has a larger volume than that of the slugs 86. This distortion of the slugs 86 permits the shaft 66 to rotate an amount less than that of the first embodiment. However, the tool and workpiece are protected in much the same manner as in the first embodiment.

While two embodiments of my invention have been shown and described, it will be apparent that other adaptations and modifications may be made without departing from the scope of the following claims.

I claim:
1. Apparatus for machining a rotating workpiece comprising means for rotatably supporting said workpiece, a shaft mounted adjacent said supporting means, said shaft including a pair of spaced cylindrical sections, a tool supported by said shaft and offset with respect thereto, said tool being adapted to contact the rotating workpiece, means for supporting said shaft for limited rotation about its axis, and means for holding said shaft from rotation during normal machining pressure and permitting limited rotation under excessive machining pressure, said shaft holding means including a distortable slug bearing against a portion of said shaft, and a chamber surrounding at least a portion of said shaft and said slug, and restricting movement of said slug while permitting distortion thereof under excessive machining pressure.

2. Apparaus according to claim 1 in which the means for supporting said shaft and the means for holding said shaft include a housing, bearings supported in said housing in axial alignment for receiving the spaced cylindrical sections of said shaft, said chamber being in said housing between said bearings, and an enlarged portion on said shaft between said cylindrical sections and extending into said chamber, said slug bearing against said enlarged shaft portion.

3. Apparatus according to claim 2 in which said chamber is square in cross section and symmetrical about the shaft axis, and said enlarged portion on said shaft is square in cross section with its diagonal being shorter than a side of said chamber, said enlarged shaft portion normally being positioned with its sides at 45° to the sides of said chamber, and said shaft holding means including four cylindrical slugs of distortable material in said chamber one bearing against each side of said enlarged portion of said shaft with their axes substantially parallel to said shaft axis.

4. Apparatus according to claim 3 in which said slugs are made of polyurethane.

5. Apparatus according to claim 2 in which said enlarged portion on said shaft has a butterfly cross section, and said chamber is divided into two compartments with a wing of said shaft extending into each compartment, and said shaft holding means including a slug of distortable material in each compartment bearing against the adjacent wing, said slugs being distorted under excessive load to permit limited rotation of said shaft.

6. Apparatus according to claim 5 in which said slugs are made of polyurethane.

References Cited
UNITED STATES PATENTS 1,212,271   1/1917   Smith _____ 29—97.5

LEONIDAS VLACHOS, Primary Examiner

U.S. Cl. X.R.

82—24, 8; 77—58; 29—97.5